Patented Feb. 19, 1929.

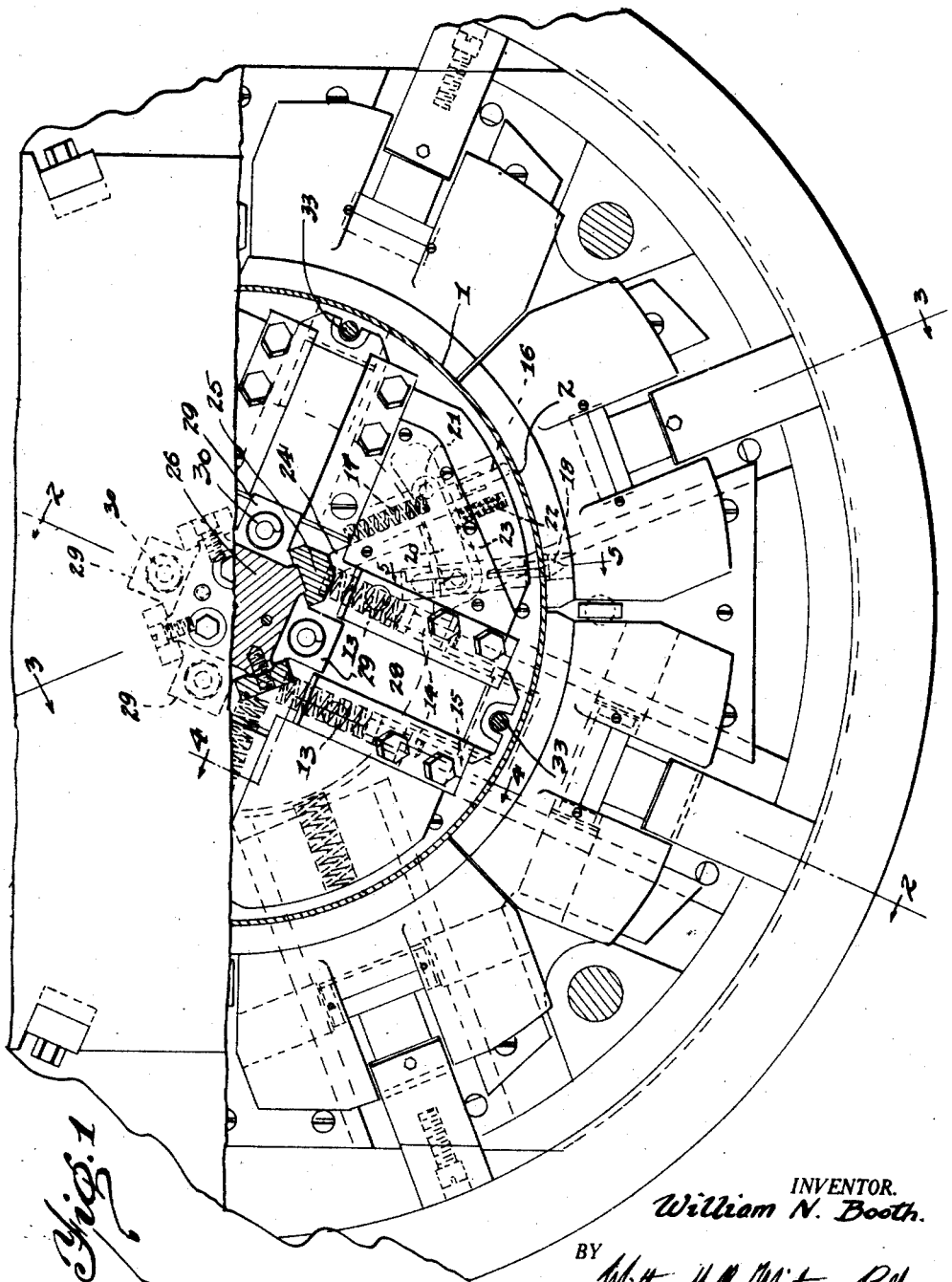

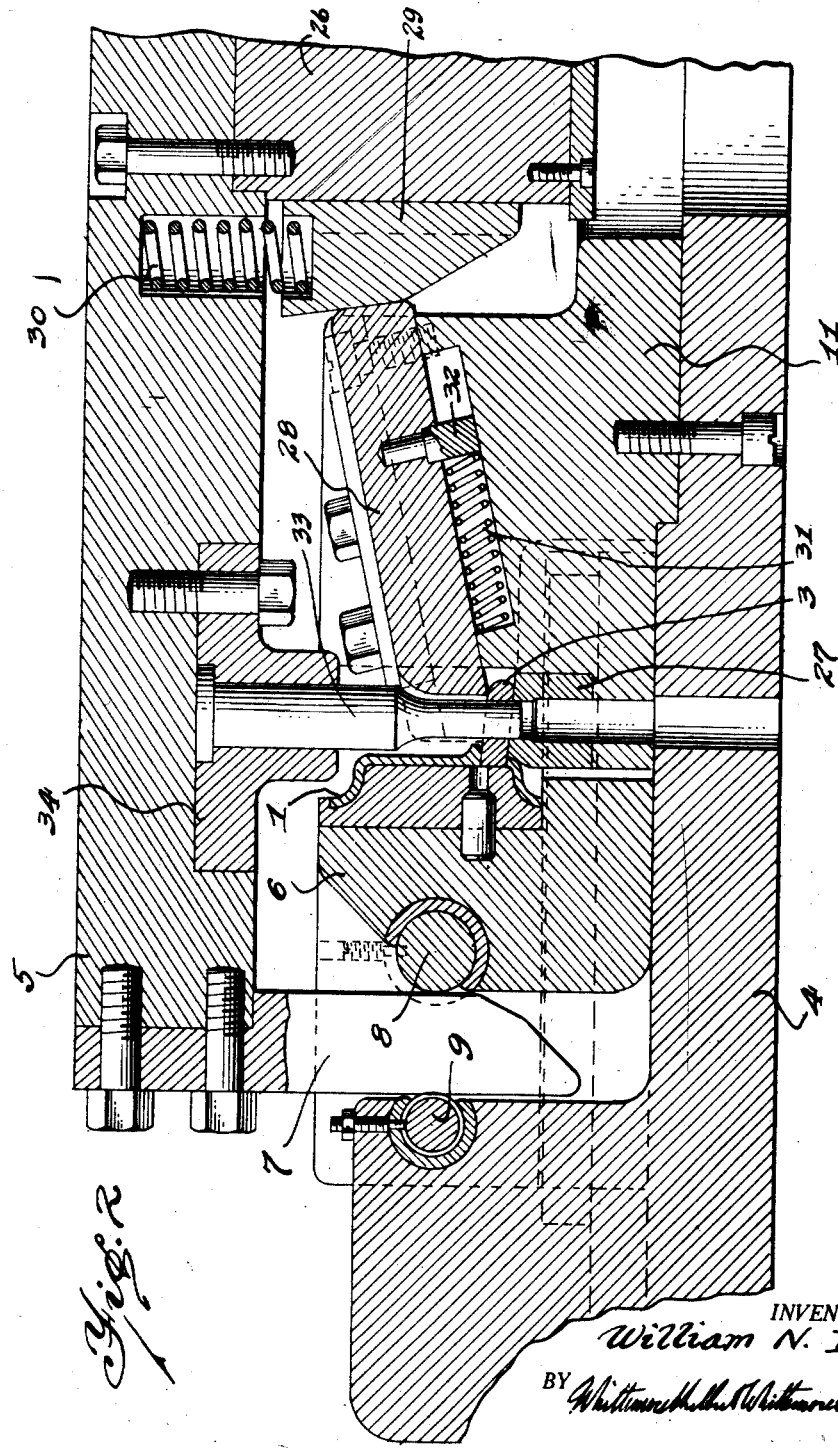

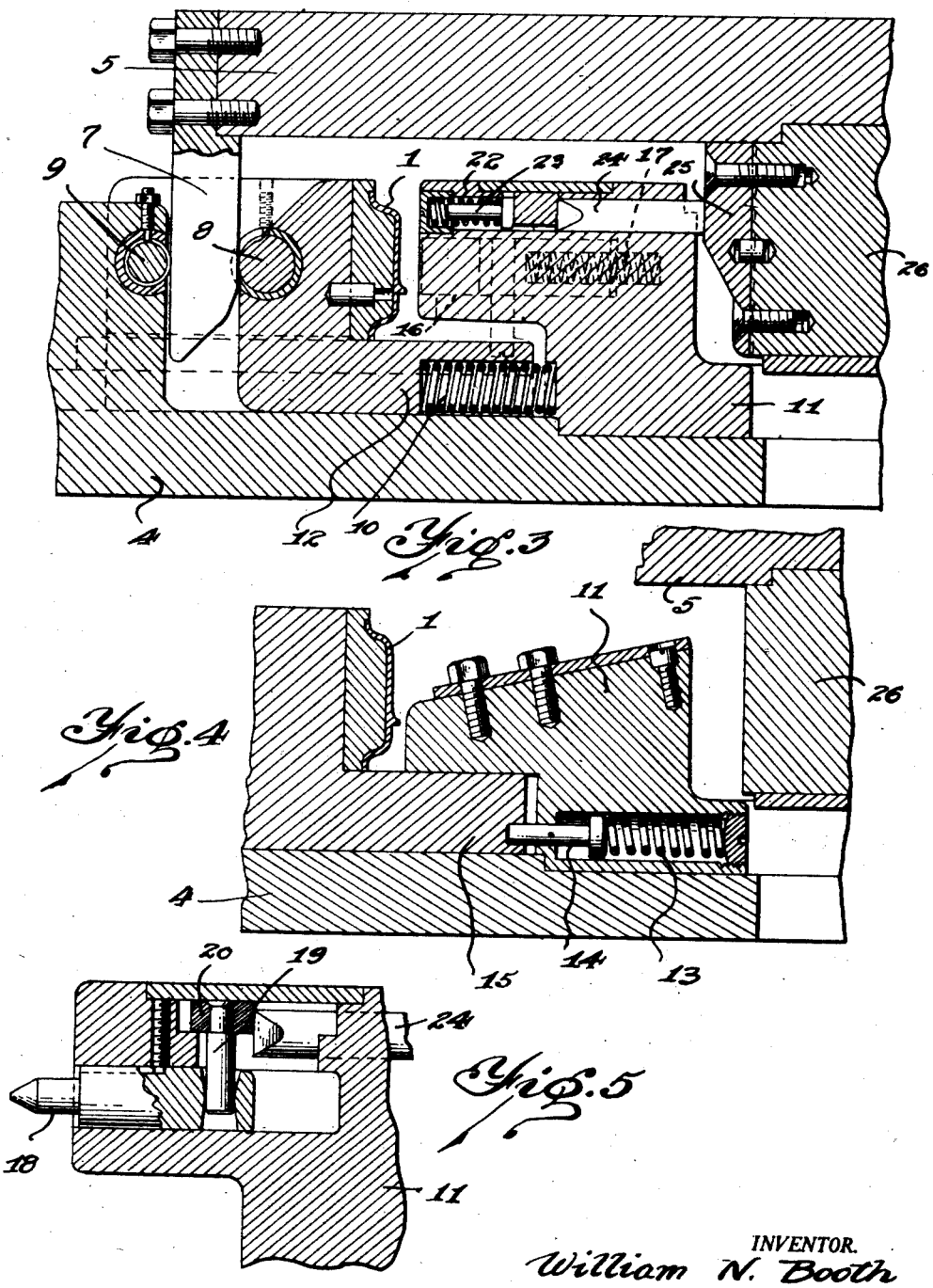

1,702,378

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

MACHINE FOR PERFORATING CLAMPING LUGS ATTACHED TO TIRE-CARRYING RIMS.

Application filed July 6, 1926. Serial No. 120,768.

The invention relates to machines for perforating clamping lugs attached to tire carrying rims. One of the objects of the invention is to provide the machine with means for mechanically positioning the rim to locate the lugs for engagement with the perforating punches. Another object is to provide a machine with means for shrinking a transversely split rim to size the same and assist in locating the lugs for engagement with the perforating punches. Further objects of the invention reside in the novel features of construction and combinations and arrangements of parts as more fully hereinafter set forth.

In the drawings:—

Figure 1 is a plan view, partly in section, of a machine embodying my invention;

Figures 2, 3, 4 and 5 are cross sections, respectively, on the lines 2—2, 3—3, 4—4 and 5—5 of Figure 1.

The machine embodying my invention is designed for use in perforating clamping lugs which are permanently attached to tire carrying rims and particularly tire carrying rims of the transversely split demountable type. 1 is the rim which is transversely split at 2, and 3 are the clamping lugs. These lugs are permanently attached to the rim in a solid or imperforate state and my machine is designed to perforate these lugs thereby providing bolt holes.

The machine is in the nature of a press and has the shoe 4 which is suitably secured to the bolster plate or bed and the holder 5 located above the shoe and vertically reciprocable toward and away from the same, this holder being adapted to be secured to the rim. For sizing the rim, I have provided the shrinking blocks 6 which are slidably mounted upon the shoe 4 and surround the rim. These shrinking blocks are movable radially inward to engage the rim and shrink the same to size as well as to shape the same. 7 are cams which are secured to and depend from the holder 5 and are engageable with the rolls 8 carried by the shrinking blocks and the rolls 9 carried by the shoe 4 to force the shrinking blocks radially inward upon downward movement of the holder. These shrinking blocks are yieldably forced radially outward so that when the holder 5 and cam 7 are in their upper positions the shrinking blocks are disengaged from the rim. As shown, every other shrinking block is yieldably forced outwardly by means of the coil spring 10 having its inner end abutting the block 11 and its outer end abutting the projection 12 of the shrinking block, which projection extends radially inward below the rim. Each of the intermediate shrinking blocks is yieldably forced outwardly by means of the coil springs 13 having their inner ends abutting the block 11 and their outer ends abutting the plungers 14 which in turn abut the bifurcations 15 formed upon these alternate shrinking blocks and extending radially inward below the rim. The block 11 is mounted upon and secured to the shoe 4 within the shrinking blocks 6. The projections 12 and the bifurcations 15 of the shrinking blocks are located to support the rim which is inserted into the machine with its outer edge lowermost.

For positioning the rim with its attached lugs to locate the latter for engagement by the perforating punches, I have provided the reciprocable bar 16 which is radially slidable in the block 11 and normally forced outwardly to engage between the ends of the rim by the coil spring 17. The outer end of this bar is rounded so that when the rim is being contracted its ends cooperate to force the bar radially inward beyond the rim so that these ends may contact. I also provide the positioning plunger 18 which is engageable in the valve hole of the rim. This plunger is radially slidable in the block 11 and it is connected at its inner end by means of the pin 19 to one end of the lever 20, the other end of this lever being connected to the block 11 by the pivot 21. 22 is a coil spring located within the block 11 and extending radially and 23 is a headed plunger which is forced against the outer side of the lever 20 by means of this coil spring to thereby normally hold the plunger 18 radially inward and away from the rim. For forcing this plunger into the valve stem hole there is the plunger 24 which is radially slidable in the block 11 and has its outer end engageable with the inner side of the lever 20 opposite the headed plunger 23. This plunger 24 has its inner end engageable with the cam 25 which is rigidly secured at the side of the block 26, this block depending centrally from the holder 5 and being rigidly secured thereto.

For clamping the lugs after the rim has been successively positioned and sized, I have provided for each lug the die 27 which is mounted upon the block 11 and is located to engage the outer face of the lug and the clamp 28 which is engageable with the inner face of the lug. This clamp 28 is in the nature of a slide movable radially upon the block 11 but inclined so that upon its outward movement the portion of its lower face at its outer end in engageable with the lug. The inner end of this slide is engageable with the cam 29 which is carried upon the holder block 26. This holder block is vertically slidable upon the holder block and is normally forced downwardly away from the holder by means of the coil spring 30 having its upper end abutting the holder and its lower end abutting the cam, the arrangement being such that the clamp 28 is yieldably forced outwardly and downwardly to contact with the lug and clamp the same in place so that variations in thickness of the lug may occur without danger of breaking the parts of the machine. Each clamp 28 is normally forced radially inward so that it will not interfere with the insertion or removal of the rim with its attached lugs, as by means of the coil spring 31, which is located in a recess in the block 11 below the clamp and has its outer end abutting the end of the recess and its inner end abutting the pin 32 which is secured to the clamp.

33 are punches carried by the punch holders 34 which in turn are carried by the holder 5, there being one punch for each lug. These punches are engageable with the lugs to perforate the same after the latter have been clamped in place.

In operation and assuming the holder 5 to be in its uppermost position, the shrinking blocks 6 to be in their radially outward positions and the positioning bar 16 to be in its radially outward position, a rim 1 with imperforate attached lugs is placed in the machine on edge and with the lugs lowermost, the rim ends being on opposite sides of the bar 16. The holder is then lowered carrying with it the cams 7, the central block 26, the cam 25 and the punches 33 and also yieldably carrying the cams 29 downwardly. The cams 7 operate to move the shrinking blocks 6 radially inward and during this radial inward movement of the shrinking blocks the cam 25 operates to move the positioning plunger 18 radially outward into the valve hole of the rim. During the radial inward movement of the shrinking blocks the ends of the rim force the positioning bar 16 from therebetween. After the rim has been shrunk to size the cams 29 operate upon the clamps 28 to yieldably force the same outwardly and downwardly to clamp the lugs upon the dies 27, after which the punches come into engagement with the lugs and perforate the same. The holder 5 then rises and the various parts assume their original positions when the rim may be removed and replaced by another.

What I claim as my invention is:

1. In a machine for perforating clamping lugs attached to a rim, the combination with means for sizing the rim, of means engageable with the rim prior to the operation of said sizing means for positioning the rim and lugs, and means for perforating the lugs after the operation of said sizing means.

2. In a machine for perforating a lug attached to a transversely split rim, the combination with means for shrinking the rim, of means engageable between the ends of the rim prior to the operation of said shrinking means for positioning the rim and lug, and means for perforating the lug after the operation of said shrinking means.

3. In a machine for perforating a lug attached to a transversely split rim, the combination with means for shrinking the rim, of means engageable between the ends of the rim prior to the operation of said shrinking means for initially positioning the rim and lug, means also engageable with the rim prior to the operation of said shrinking means for maintaining the rim and lug in position during the operation of said shrinking means, and means for perforating the lug after the operation of said shrinking means.

4. In a machine for perforating a lug attached to a rim, the combination with means for sizing the rim, of means engageable with the rim prior to the operation of said sizing means for positioning the rim and lug, means for clamping the lug in place after the operation of said sizing means and means for perforating the lug after the operation of said sizing means.

5. In a machine for perforating a lug attached to a transversely split rim, the combination with means for shrinking the rim, of means engageable with the rim prior to the operation of said shrinking means for positioning the rim and lug, means for clamping the lug in place after the operation of said shrinking means, and means for subsequently perforating the lug.

6. In a machine for perforating a lug attached to a transversely split rim, the combination with means for shrinking the rim, of means engageable between the ends of the rim prior to the operation of said shrinking means for initially positioning the rim and lug, means engageable in the valve hole of the rim prior to the operation of said shrinking means for maintaining the rim and lug in position, means for clamping the lug in place after the operation of said shrinking means, and means for subsequently perforating the lug.

7. In a machine for perforating a lug attached to a transversely split rim, the combination with members movable radially inward toward the rim for shrinking the same, of a member engageable between the ends of the rim for initially positioning the rim and lug, said member being movable away from the rim prior to the final portion of the movement of said shrinking members toward the rim, a plunger movable radially outward into engagement with the valve hole in the rim prior to the final portion of the movement of said shrinking members toward the rim, a punch engageable with the lug to perforate the same and means for actuating said shrinking members, plunger and punch.

8. In a machine for perforating lugs attached to a transversely split rim, the combination with members movable radially inward toward the rim for shrinking the same, of a member engageable between the ends of the rim for initially positioning the rim and lugs, said member being movable out of engagement with the rim prior to the final portion of the movement of said shrinking members toward the rim, a plunger movable radially outward into engagement with the valve hole in the rim for maintaining the rim and lugs in position, members movable into engagement with the lugs for clamping the same, punches engageable with the lugs for perforating the same, and means for actuating said shrinking members, plunger, clamping members and punches in timed relation.

9. In a machine for perforating lugs attached to a transversely split rim, the combination with members movable radially inward toward the rim for shrinking the same, of means engageable with the rim for positioning the rim and lugs, members movable into engagement with the lugs for clamping the same, punches engageable with the lugs for perforating the same, and means for actuating said shrinking members, clamping members and punches in timed relation, including cam means engageable with said clamping members, and means for yieldably moving said cam means.

10. In a machine for perforating lugs attached to a rim, the combination with means engageable with the rim for sizing the same, of means for positioning the rim and lugs including a plunger engageable in the valve hole of the rim, a pivotal lever connected to said plunger, a spring for normally holding said plunger away from the rim, a cam for swinging said lever to move said plunger toward the rim, and punches engageable with the lugs to perforate the same.

In testimony whereof I affix my signature.

WILLIAM N. BOOTH.